(12) United States Patent
Paredes Urzua (10) Patent No.: US 7,677,164 B2
(45) Date of Patent: Mar. 16, 2010

(54) PRESSURIZED REACTOR FOR FOOD PROCESSING

(76) Inventor: Abel Luis Paredes Urzua, Christobal de Olid 307, Chihuahua (MX)

(*) Notice: Subject to any disclaimer, the term of this patent is extended or adjusted under 35 U.S.C. 154(b) by 126 days.

(21) Appl. No.: 11/702,379

(22) Filed: Feb. 5, 2007

(65) Prior Publication Data

US 2007/0283820 A1 Dec. 13, 2007

(51) Int. Cl.
*A47J 27/00* (2006.01)
(52) U.S. Cl. .............. 99/331; 99/324; 99/337; 99/348; 99/353
(58) Field of Classification Search ........... 99/324–338, 99/339, 340, 348, 467–479, 483–487, 516, 99/372, 275–323, 444–450, 323.4, 323.5, 99/352–355; 426/520–523, 557, 235, 529, 426/236, 450–456; 219/400, 401; 425/559, 425/346; 366/144–149, 336–340
See application file for complete search history.

(56) References Cited

U.S. PATENT DOCUMENTS

| | | | | |
|---|---|---|---|---|
| 5,462,758 | A | * | 10/1995 | Ventres et al. .............. 426/557 |
| 5,669,288 | A | * | 9/1997 | Zittel et al. .................... 99/348 |
| 6,066,348 | A | * | 5/2000 | Yuan et al. ................... 426/236 |
| 6,105,485 | A | * | 8/2000 | Zittel ............................ 99/348 |
| 6,234,066 | B1 | * | 5/2001 | Zittel et al. .................... 99/348 |
| 6,294,211 | B1 | * | 9/2001 | Yuan et al. ................... 426/235 |
| 6,436,279 | B1 | * | 8/2002 | Colyar ......................... 208/108 |
| 7,500,426 | B2 | * | 3/2009 | Zittel et al. .................... 99/348 |
| 2007/0190643 | A1 | * | 8/2007 | Noll ......................... 435/290.3 |

* cited by examiner

*Primary Examiner*—Timothy F. Simone
(74) *Attorney, Agent, or Firm*—Defillo & Associates, Inc.; Evelyn A. Defillo

(57) ABSTRACT

The subject of this invention is a reactor for food processing in a composite geometrical shape, and a cover screwed in to the upper section, which principle of operation to generate high levels of temperature and pressure will be to utilize hot air supplied by a compressor in series with a heat exchanger, which conducted through 3 inputs designed in position and angle to, in combination with the helicoidally design of the interior and a relief exit, generate a hurricane like effect that maintains the food in constant movement during all the process cycle time. The reactor is equipped with entrance and exit fast action butterfly like valves activated by mechanical actuators and temperature and pressure sensors, all connected in a network and managed by a Programmable Logic Control that monitors the parameters and executes the actions by software.

15 Claims, 5 Drawing Sheets

PRESSURIZED REACTOR FOR FOOD PROCESSING

FIELD OF THE INVENTION

This present invention refers to a reactor designed for food processing for human consumption that reduces inefficiencies caused due to the obsolescence of the technologies currently utilize in the industry, such like direct heat application from gas, electricity or steam at high temperature, which exhibit a high degree of raw material, energy and other direct materials waste, as well as a high variation of critical parameters that has a repercussion in the quality of the product.

This proposal offers different principles that involve mechanics of fluids applications, pressurized air, heat transfer devices and an architecture of design equipped with automatic control devices that reduces cycle times, increases processing capacity and minimizes raw material and direct items wastes, reducing costs of processing. Among the most important advantages, can be mentioned the more homogeneous gelatinization of carbohydrates in the food that eases the digestion, the higher concentration of the original nutrients such like Complex B vitamins and proteins, and a higher retention of dietary fiber, as well as the grain preparation for subsequent processes.

BACKGROUND OF THE INVENTION

The pressurized food processing industry utilizes basically the same principle of operation, that consist on pouring the product to be processed into a metallic container named reactor, then it is sealed and energy is applied through an external heat and pressure source, that normally is water steam in ranges of 150° C. to 200° C., then it is agitated by transmissions and motors to ensure an homogeneous cooking of the product, and await until the interior of the device reaches the ranges of 150 to 200 pounds per square inch, that may take intervals of 10 to 20 minutes.

The patent from United Kingdom GB1262718, proposes a device to process expanded cereals in a continuous mode, comprised the steps for entering the product as grain or flour, in a pressurized heated gas stream, typically superheated steam, that is then discharged in a low pressure gas atmosphere, and the expansion effect take place. The present invention in comparison has the advantages of utilizing hot air as the main heating element and is equipped with electronic control devices.

The patent from the U.S. Pat. No. 4,702,158 proposed an apparatus for puffing corn by a fan that irradiates heat from an internal heating element into the chamber where the product is being processed. This apparatus has the limitation of processing only corn and does not operate at high temperature or pressure ranges. The present invention in comparison has the advantage of being capable to process several crops, by using pressure and temperature at high levels in a controlled manner by electronic devices.

The patent from the United Kingdom GB2186180 presents an apparatus for cereal popping, that comprises a rotatable baking drum, with hopper and screw feeder to continuously feed the cereals into, a device for collecting the dehydrated cereal after the baking drum, the transportation to a ejection cylinder where the cereal is subject to the action of a high temperature steam flow, and an opening device to expose the moisture laden cereal to the effect of the expansion by depressurization. The present invention in comparison has the advantages of being built of one single piece structure, utilized hot air at high pressure and has electronic control devices installed.

The patent from Europe EP0274358 proposes a machine for the production of puffed cereals comprising of two rotation drums with sealed lids of automatic closing and mounted on a platform. The present invention in comparison has the advantages of being built of one single piece, does not has rotating elements and does not require mechanical external devices. It also has electronic control devices installed.

The patent from Japan JP62294071 presents a device that fees raw material through a pipeline heated by water steam up to a reactor where the steam is removed, from the reactor the product is discharged through a nozzle located at the bottom of the reactor, in this way the product is released from the high temperature and pressure atmosphere to the atmospheric environment through the nozzle. The present invention in comparison has the advantages of not requiring additional pipelines, utilized hot air instead of steam as the main thermal agent and has electronic control devices installed.

The patent from Japan JP63014661 presents a machine to expand and process granular raw material from cereals in shape of twisted cake with no need of cutting devices in continuous flow, expanding as extruding the material through a pressure nozzle, and twisting the cake with a rotary disc that also cuts the line. The present invention in comparison has the advantages of being built of one single piece, to process other types of food besides cereal raw materials and does not incorporate rotary elements. It also has electronic control devices installed.

The patent from Europe EP0344664 presents an apparatus for processing products with starch, by the exposure in a reaction chamber to the gravity effects or a centrifugal field, where a combination of air and steam injected at high speed in several angles, the mixture to be processed in the product is introduced with the air and the steam, and in the expansion chamber a velocity component opposite to the direction of the field is imposed to the steam and air flow. The present invention in comparison has the advantages that it utilizes hot air instead of steam, does not incorporate mobile parts and does not require external mechanical elements to induce movement, and that it is built of on single piece. It also has electronic control devices installed.

The U.S. Pat. No. 5,069,923 presents an apparatus for expanding amaranth grains, feed into a cylinder with small perforations to which hot air is applied externally, the expanded grain is collected in the perforated screen and transported outside the cylinder. The present invention in comparison has the advantages of processing other types of food besides cereals such as amaranth, it works with hot air feed at high pressure and it has electronic control devices installed.

The U.S. Pat. No. 5,263,405 presents a machine for corn popping by the utilization of hot pressurized air from a blower motor and heating coil. The present invention in comparison has the advantages of processing other types of foods besides cereals, and utilizes hot air at high pressure from a compressor. It also has electronic control devices installed.

The U.S. Pat. No. 5,614,239 presents a spherical chamber for puffing and cooking several matters from flour, utilizing hot air from a high temperature element induced by a fan than drives the air into the chamber directly or in spiral from top to bottom and bottom up and cooks the starches in the flour, and then lower temperature air is induced to cool the product down. The present invention in comparison has the advantages to operate at higher ranges of pressure, to process a wider variety of foods, and generate an internal flow like a hurricane in the inside. It also has electronic control devices installed.

The U.S. Pat. No. 5,562,021 presents a device based in a cylindrical shape with an internal cavity and a piston than runs into the cavity where the cereal or flour pellets are deposited ad temperature is applied, the piston running increases the pressure inside, which when is released the puffing effect takes place. The present invention in comparison has the advantages of do not incorporate mechanical elements for pressure and utilizes compressed hot air to pressurize. It is built of one single piece and does not have mobile parts. It also has electronic control devices installed The patent from China CN1107660 presents a device for puffing and preserving fruits with high nutritious value, composed by a tank for high pressure and temperature puffing, connected to sections of vacuum, heating, cooling and compressed air. The fruit is heated, pressurized and depressurized instantaneously in the puffing tank. The present invention in comparison has the advantages of processing a wide variety of foods besides fruits, it is built of one single piece, does not require vacuum chamber, nor cooling either, and it has electronic control devices installed.

The patent from Japan JP8023909 proposes a device for puffing grains comprised by a chamber of pressurized air flow and a cereal feeder, connected through an on-off valve at the top and bottom sides, equipped with a porous plate at the lower side that opens an closes and allows the pass of hot steam fed from a steam source, the lower part gets connected to a low pressure chamber with a device that generates the vacuum that provokes the effect of puffing. The present invention in comparison has the advantages that it is built of one single piece, does not have mobile pieces, utilizes hot air instead of steam to heat and pressurize, does not requires vacuum to generate the effect of puffing and it also has electronic control devices.

The U.S. Pat. No. 5,660,098 presents a machine comprised of a stationary barrel horizontally mounted and heated by electrical coils, with another concentric barrel spinning inside and with high temperature steam injected that generates the required pressure for the puffing effect. The present invention in comparison has the advantages of being built of one single piece, does not have internal mobile parts, utilizes hot air instead of steam for pressurizing and heating, does not uses electricity and it has electronic control devices installed.

The U.S. Pat. No. 5,755,152 proposed an oven to cook pastas and flavors from several grains, by a machine comprised of a 3 sliding molds for loading the product, baking and discharging it in continuous flow. The present invention in comparison has the advantages of processing other types of foods besides pastas and flavors, it does not have mobile parts because it is build in one single piece, and it has electronic control devices installed.

The U.S. Pat. No. 5,846,584 presents an apparatus to fusion cereals or flavors with additives and sweeteners, utilizing electricity transformed in ultrasound energy to agglutinate the flavors and starches, mixing them with flavors and delivering the product in one single piece. The present inventions in comparison has the advantages of being built of one single piece, it process other types of foods besides cereals and flavors, does not have mobile parts or external devices, utilizes high pressure hot air to generate the operating conditions and has electronic control devices installed. It does not require electricity to operate.

The U.S. Pat. No. 581,793 presents a process to puff rice, starting from previously puffed grain and concentrated in one single piece and baked by the application of ultrasound. The present invention in comparison has the advantages of processing other types of food besides of rice, it has no mobile parts nor external devices, utilize pressurized hot air to generate the required operating conditions and has electronic control devices installed. It does not require electricity to work.

The patent from Russia RU2137407 presents an apparatus for processing grains, comprised on two fixed plates interconnected through guides on which movable plates are mounted, it has two heating units on each side of the guides attached to the fixed plates. It has a ring that gets positioned over the lower heating unit and that is attached to the movable upper plate, a linking mechanism drives the lower heating unit. The lower plate is positioned in such a way that drives its movement. The present invention in comparison has the advantages of being built of one single piece, it has not movable parts not internal structures, utilizes hot air and has electronic control devices installed.

The U.S. Pat. No. 6,171,631 presents a method for puffing product prepared with cereal flour, by the usage of radiated energy from microwaves. The present invention in comparison has the advantages that utilizes hot air as the thermal agent and pressure generator, it has electronic control devices installed, it does not work with electricity and the cooking process allows the preservation of more natural nutrients in the food.

The patent from Japan JP2003152662 proposed a method to process cereals by the pressurization and heating of the product my mechanical jeans, and depressurize the product by the exposure to the environmental pressure. The general concept behind is of a mechanical press that compresses the product held in molds at high temperature. The present invention in comparison has the advantages of being build of one single piece, it does not have external mechanical pieces to generate pressure, utilized hot air and it has electronic control devices installed.

The patent from Japan JP2003333992 presents an apparatus to process barely cakes with water, that feeds the cereal in a heated and pressurized chamber inside an expansion machine, when the chamber is heated the pressure inside increases, and then is released producing the expansion of the cereal. The present invention in comparison has the advantages of processing other types of foods besides barely cakes, it is build of one single piece, it has not mobile parts, utilizes hot air to heat and pressurize, and it has electronic control devices installed.

The patent from Japan JP2003334011 presents an apparatus for expanding cereal comprised by a cylinder and a conveyor with screw shape, the cereal is heated while is being transported through the cylinder to the opposite side where the cereal is accumulated, there high pressure is applied by the screw and then the cereal is expulsed through an extrusion nozzle placed at the side of the cylinder. The present invention in comparison has the advantages of being built of one single piece, it has no mobile parts nor mechanical devices, it utilizes hot air for pressurizing and heating the cereal and it has electronic control devices installed.

The patent from Spain ES2198895 presents an apparatus for expanding grains and vegetables that comprises a preheating device where the raw material is heated for a time, and then is transported into a sealed container with lids controlled by external devices, and then hot steam is applied to complete the cooking process and increase the internal temperature of the container, all of that performed with external devices; when the pressure and temperature reach the right levels, the load is depressurized and leave the container completely expanded. The present invention in comparison has the advantages of being built of one single piece, it has no external or mechanical devices, utilizes hot air to heat and pressurize the reactor, does not require additional pipelines to transport the product, nor pre-heating devices either. It also has electronic control devices installed.

The patent from Russia RU2220586 presents an method for expanding grain that consist on feeding the grain previously wet into a high pressure chamber heated by high temperature steam, and the abrupt discharge to atmospheric level pressure and having the expanding effect made. The present invention in comparison has the advantages of utilizing hot air fir pressurizing instead of steam, it has electronic control devices installed and works with smaller loads and cycle times.

The patent from Japan JP2004105102 presents an apparatus to swell cakes by the usage of movable molds upwards and downwards, where the raw material is deposited, the mold constitutes a high temperature pressurized press that change the high temperature and pressure to the environmental levels instantaneously to produce the expansion. The present invention in comparison has no mobile parts or external devices, does not utilize mechanical devices to increase the pressure, it process other types of foods and it has electronic control devices installed.

The patent from China CN1583235 presents an apparatus for grain puffing with hot air, comprised by a compressor, valves, air filter, temperature regulator, grain spinning feeder, air flow puffing chamber, puffed grain collection container, hot air compressor and humidifier. All the aforementioned placed in blocks integrated into a single system where the grain is fed, the high pressure air is filtered and injected to increase the temperature and pressure in the chamber where the product is puffed. The present invention in comparison has the advantages of being built of one single piece, it does not have external devices nor mobile parts, it does not require pipelines nor conveyors to transport the product, it does not need containers nor additional chambers and it has electronic control devices installed.

The patent from Japan JP2005198507 presents an apparatus to process extruded confectionery in predetermined geometrical shapes, comprised by a feeder to access the crushed cereal, a barrel continuously pressurized and maintained at high temperature where the cereal is deposited and a nozzle and a cutter where the product is extruded and shaped to the desired figure. The present application in comparison has the advantages of being able to process all types of foods that contains starches besides cereals, it does not have mobile parts, it is built of one single piece and it has electronic control devices installed.

The patent from U.S. Pat. No. 6,935,855 presents an apparatus for processing foods with water content, comprised by an extrusion chamber of controlled pressure and exposed to high temperature to evaporate the water from the product, it transports the product through a sluice to the section of extruding nozzles, where the product is extruded and processed. The present invention in comparison has the advantages of process the food with a minimum content of water, it utilizes hot air so it does not require exposure to external sources of heat, and it has electronic control devices installed.

DETAILED DESCRIPTION OF THE INVENTION

The present invention to a reactor that operates in temperature and pressure ranges of 300 to 500 centigrade degrees, and 150 to 250 pounds per square inch respectively, that offers significant improvements in its performance as compared with the conventional systems for cereal processing in terms of efficiency and capacity.

Figure 1:
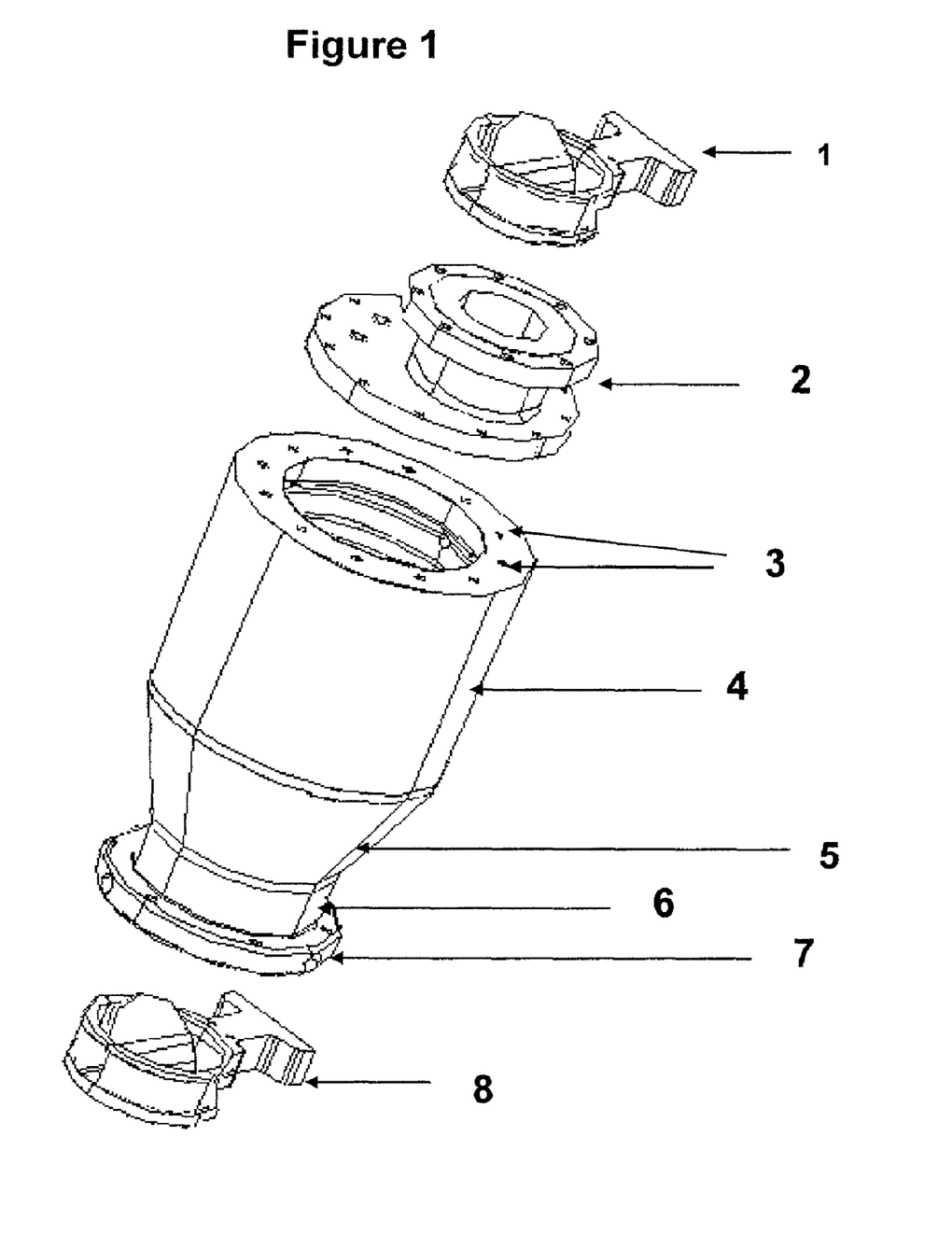
In FIG. 1 can be seen an exploded view of the reactor and the parts that composes it, the upper view shows a fast action butterfly type valve 1 that is assembled to the cover 2 that in turns is fastened to the upper part of the reactor 3 by a set of screws; the body of the reactor is made of three sections, the upper section 4 that is cylindrical, the middle section 5 that is conical, and the lower section 6 that has a cylindrical end, and a flat base 7, where another fast action butterfly type valve 8 is assembled. The actuators of these valves 1 and 8 are not shown here.

The cereal, previously prepared with a solution specially formulated for optimizing the processing, is fed into a metallic bin in trapezoidal shape, not shown in the any drawing, and from there by a leaned pipeline that connects the bin with the upper rounded cover not shown in any drawing, which in turns is fastened to the entrance fast action butterfly type valve referred as item 1 of FIG. 1 by screws. This fast action butterfly type valve is fastened to the upper cover referred as item 2 of FIG. 1 of the reactor itself; the upper cover is assembled to the upper section of the body reactor by screws. The cereal slides from the bin and trough the pipeline into the reactor when the Programmable Logic Controller, not shown in any drawing, that runs the software specifically written for this application, activates the automatic actuator that in turns opens the butterfly type valve to allow the passing of the food inside.

The reactor includes a metallic bin at the top of it to feed the product inside the reactor by sliding the product through the top cover and the upper fast action valve. Furthermore, the reactor includes an upper fast action valve butterfly type a the top cover and its actuator. The valve is fastened with screws to the top cover and another individual cover that goes on top of both, allowing the pass of the food to be processed through them.

Figure 3:
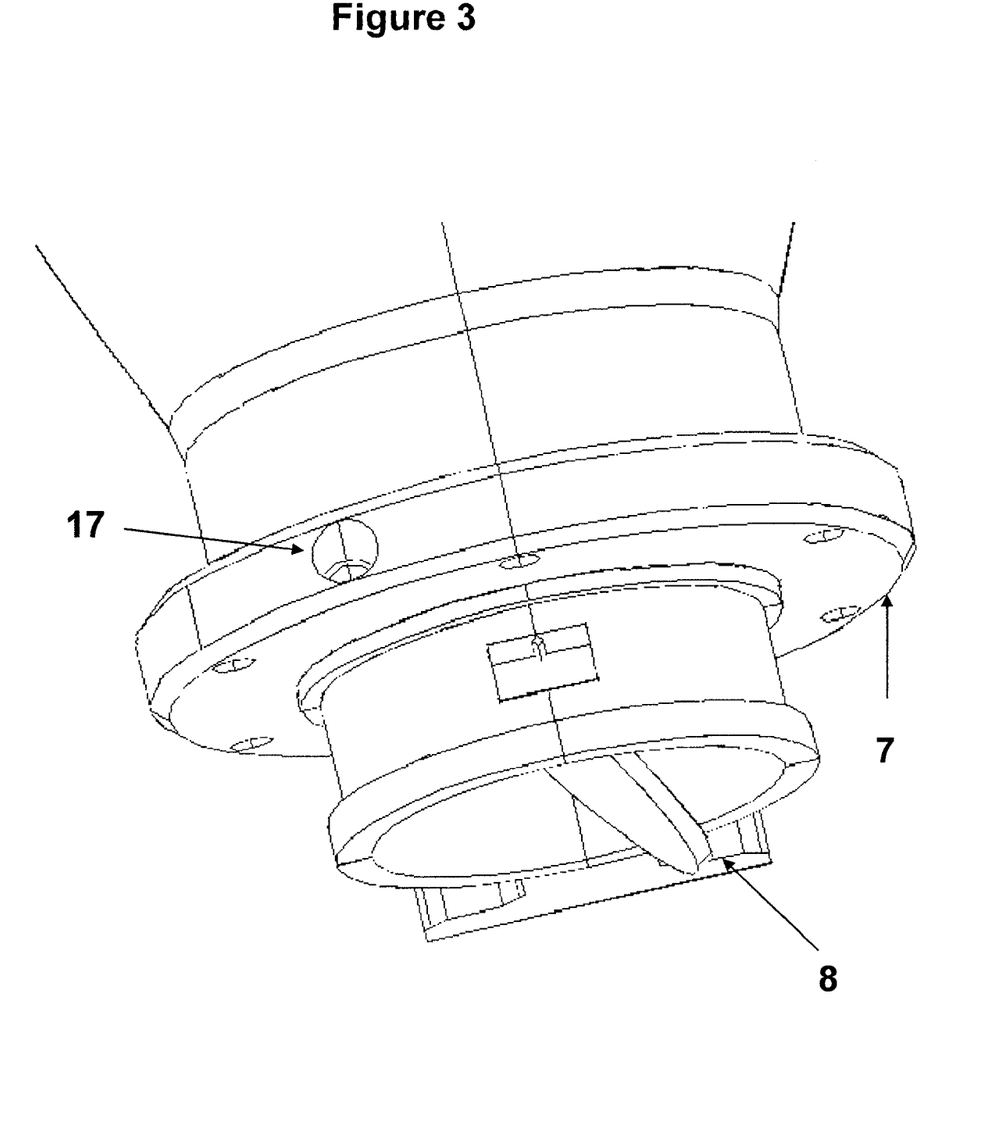
In FIG. 3 a lateral view of the lower section can be seen in more detail, the flat base 7 where the fast action butterfly type valve 8 is assembled and which actuator is not shown in this figure, the valve is presented in open position to show the metallic disc that closes the interior of the reactor, this valve is fastened to the reactor by another flat metallic cover not shown in this figure in a sandwich type assembly with this valve staying in the middle of the flat base and the flat metallic cover. In the flat base 7 one of three openings 17 can be seen, where the nozzles that feed the air are mounted, the nozzles are not shown in this figure, and are placed equidistant to each other around the circumference of the base.

Once inside the reactor, the Programmable Logic Controller closes the fast action butterfly type valve, which closing is hermetically sealed, and then activates the hot air valve that comes from a compressor and the heat exchanger, allowing the passing of it through the three nozzles referred as item 17 of FIG. 3. The hot air injected though the three nozzles equidistant from each other, located in the base of the reactor, and placed with certain angle in reference with the internal wall of the reactor, which in combination with the helicoidal grooving of the internal wall creates a hurricane like effect that moves the grain in the interior which such intensity that maintains it in constant movement, while being subject to a process of homogeneous and controlled cooking that does not provoke any type of mechanical or thermal stress.

Figure 2:
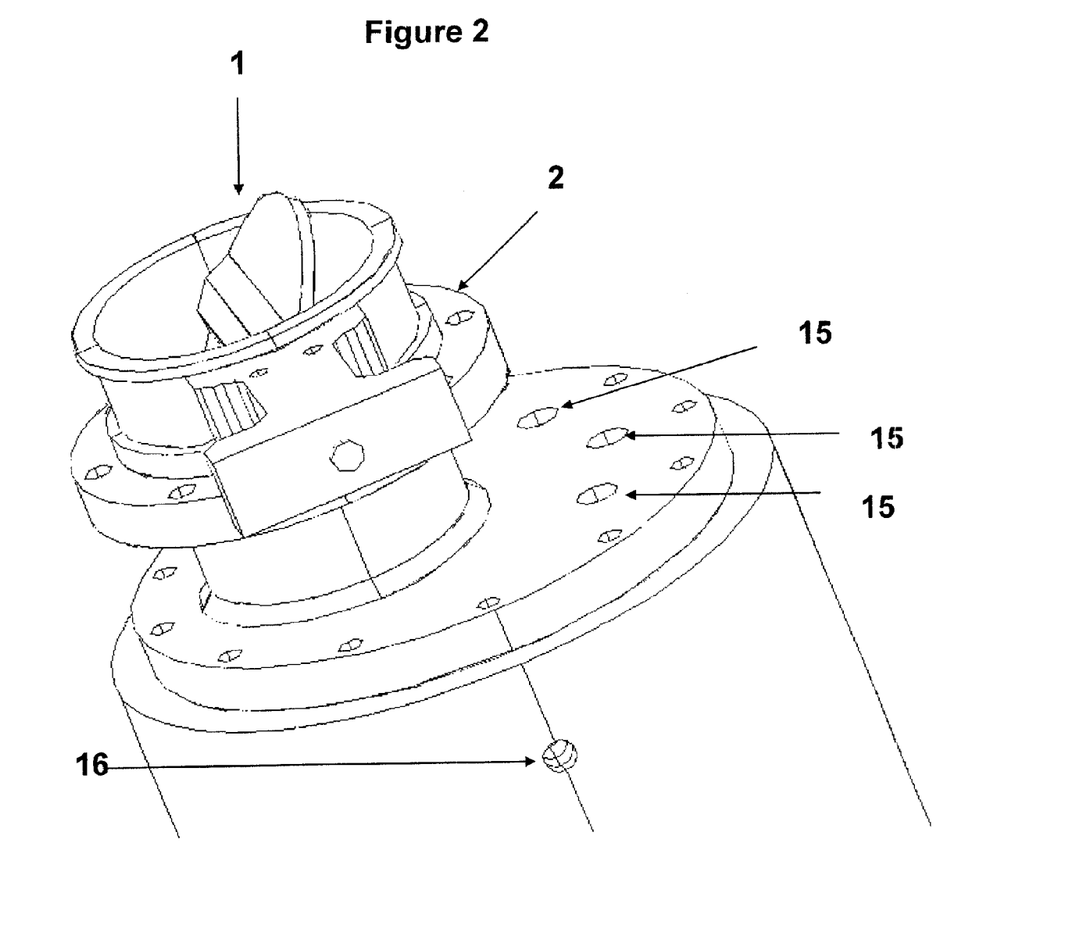
In FIG. 2 can be observed a lateral view of the upper section in more detail, beginning with the fast action butterfly type valve 1 which actuator is not shown in this figure and is presented in open position to observe the metallic disc that controls the entrance to the reactor, this valve goes mounted in a sandwich type assembly on top of upper cover 2, with this valve staying in the middle of the cover and a flat metallic cover not shown here either, that fastens it by the upper side with long screws. The upper cover 2 shows three holes 15 where the temperature sensor, the pressure sensor and the safety valve are located; none of these devices is shown in this figure. In the upper section of the reactor it can be seen an opening 16 where a relief valve is located, the valve is not shown in this figure either.

The output where relief valve referred as item 16 of FIG. 2 goes is located in the upper section of the body of the reactor, and allows the flow of air to circulate to the outside from the inside, to maintain the hurricane like effect permanently, and control the increase of temperature and pressure to be gradual. The temperature and pressure sensors monitor the behavior of the temperature and pressure on real time by electronic signals that are feedback to the Programmable Logic Controller according to the instructions contained in the software.

Figure 4:
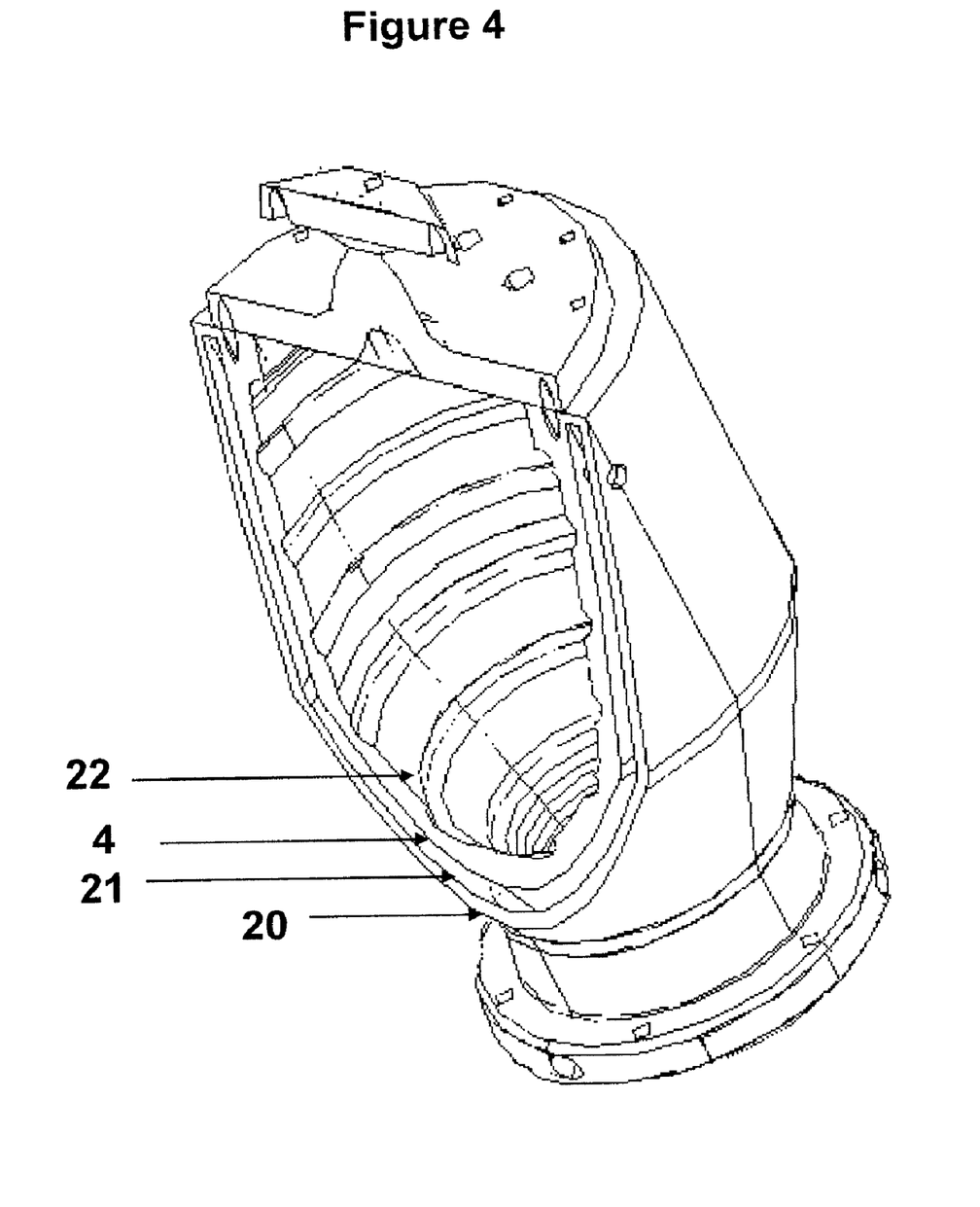
In FIG. 4 a sectional view of the body of the reactor can be seen where the jacket type insulation 20 is shown, that is concentric with the reactor and stays separated by a hollow 21 from the body of the reactor 4, and both attached by fasteners not shown in this figure. Also a view of the internal wall 22 of the reactor is shown, where the helicoidally grooving is observed through all the inside of the body of the reactor.
Figure 5:
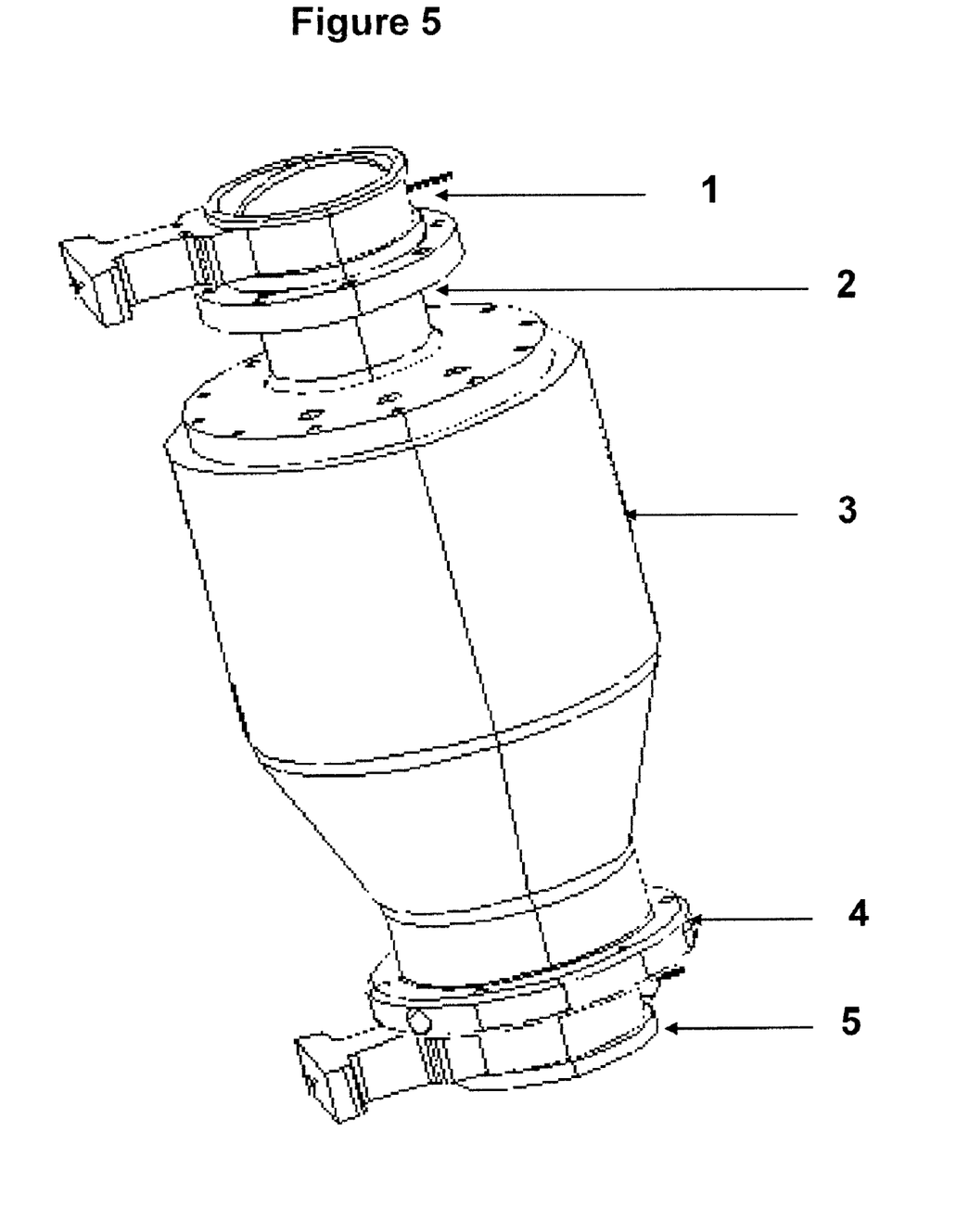
In FIG. 5 shows the reactor fully assembled with all the parts mentioned before, the fast action butterfly type valve 1 for the entrance, the cover 2 fastened to the body of the reactor, the body of the reactor 3 itself, the lower section flat base 4, and the fast action butterfly type 5 for the exit. The actuators for valves 1 and 5 and the upper and lower flat metallic covers are not shown in this figure.

The hot and pressurized air that exits through this relief output is feedback to the reactor but through the hollow 21 formed between the external wall and this jacket type insulation concentrically to the reactor referred as item 21 of FIG. 4, in such a way that the body of the reactor is maintained at high temperature ranges in a stable way, keeping the cycle time constant and avoiding the loss of temperature and delays when regaining the lost heat for the next load of food, recycling the energy of the hot air that is reutilized this way. Once the hot air heated the external wall of the body of the reactor is released to the atmosphere by a pipeline that is not shown in any drawing.

In such case where an out of the range pressure increase occurs, the pressure sensor (not shown) sends and electronic signal to the Programmable Logic Controller in order to close the supply of air coming from the compressor until the pressure returns to the specified parameters. As an additional safety item, there is a safety valve in the upper cover (not shown) that releases the excess of pressure in case a faster depressurization be needed, and as a last resource, the upper cover and the screws that fastens it to the body of the reactor have been designed to get loose immediately, without allowing a complete detachment of the cover from the body of the reactor, to release the excess of pressure in the fastest way.

When temperature and pressure have reached the required levels for the optimal processing, and the sensors have feedback these values to the Programmable Logic Controller by electronic signals, the controller stops the flow of air closing the respective valves form the compressor, and sends a signal to the actuator of the fast action butterfly type exit valve, referred as item 8 of FIG. 3, formed by a base joined to a circular metallic frame and a flat disc inside, fastened to the frame with a shaft in such a way that the disc can spin up and perform the movements for closing and opening by this actuator not shown in any drawing. When the valve opens and releases immediately provokes the instantaneous depressurization of the interior, generating the effect of puffing in the food, and releasing the reactor for the next cycle that initiates when the Programmable Logic Controller sends the corresponding signal to actuator of the fast action butterfly like exit valve to close it, and another signal to the actuator of the fast action butterfly type entrance valve to allow the pass of the next load of food to initiate the next cycle.

What is claimed is:

1. A reactor for food processing comprising:
   a main body, wherein the main body includes an external wall, an internal wall, a top portion having a cylindrical shape, a middle portion having a conical shape, and a bottom portion having a cylindrical shape;
   a bottom base connected to the bottom portion of the main body;
   a top cover connected to the top portion of the main body;
   an upper fast action valve connected to the top cover, wherein the food slides through the upper fast action valve before entering the top portion of the reactor;
   a spiral grooved to the internal wall of the main body;
   wherein a hot fluid is introduced into the bottom base of the reactor by at least one nozzle;
   wherein the at least one nozzle allows the injection of a hot fluid into the reactor, wherein the at least one nozzle is placed at an angle in reference with the horizontal side of the bottom base to create a helicoidally effect inside the main body;
   wherein the spiral and the nozzle work together to maintain the helicoidally spiral effect in the hot fluid inside the main body.

2. The reactor according to claim 1 further comprising a bin connected to the top portion of the main body.

3. The reactor according to claim 1 wherein the upper fast action valve is a butterfly type.

4. The reactor according to claim 1 further comprising an external source of pressurized hot fluid controlled by a computer.

5. The reactor according to claim 1 further comprising a relief valve in the middle portion of the body to allow the hot fluid inside to escape out of the reactor and maintain the spiral effect and to control the increments of the internal pressure.

6. The reactor according to claim 1 further comprising an external jacket located around the main body, wherein there is a hollow space between the external jacket and the main body.

7. The reactor according to claim 6 further comprising a relief valve in the middle portion of the body to allow the hot fluid inside to escape out of the reactor;
   wherein the hot fluid that comes out of the relief valve at the middle portion of the body is injected through the hollow space between the external jacket and the main body of the reactor to maintain a stable temperature.

8. The reactor according to claim 1 wherein the safety valve opens up when the increase of the internal pressure has reached a pre-determinate level.

9. The reactor according to claim 1 wherein loosening the fastening action of the top cover without releasing it completely allows the excess of pressure to escape to the atmosphere when the pressure has a pre-determinate level.

10. The reactor according to claim 1 further comprising an electronic pressure and temperature sensors that communicate with a programmable logic controller (PLC) via electronic signals to proceed to the closing of the hot fluid.

11. The reactor according to claim 1 wherein the reactor operates at temperatures from 300 to 500° C. and a pressure from 150 to 250 pounds per square inch.

12. A reactor for food processing comprising:
- a main body, wherein the main body includes an external wall, an internal wall, a top portion having a cylindrical shape, a middle portion having a conical shape, and a bottom portion having a cylindrical shape;
- a bottom base connected to the bottom portion of the main body;
- a top cover connected to the top portion of the main body;
- an upper fast action valve connected to the top cover, wherein the food slides through the upper fast action valve before entering the top portion of the reactor;
- a lower fast action valve and its actuator mounted in the bottom base;
- a spiral grooved to the internal wall of the main body;
- wherein a hot fluid is introduced into the bottom base of the reactor by at least one nozzle;
- wherein the at least one nozzle allows the injection of a hot fluid into the reactor, wherein the at least one nozzle is placed at an angle in reference with the horizontal side of the bottom base to create a helicoidally spiral effect inside the main body;
- wherein the spiral and the nozzle work together to maintain the helicoidally spiral effect in the hot fluid inside the main body;
- wherein the reactor is controlled by a programmable logic controller (PLC) that executes functions according to software specifically developed for this application, wherein the PLC controls all the electronic sensors and actuators of the reactor.

13. The reactor according to claim 12 further comprising:
- an electronic temperature sensor at the top cover to monitor and track the internal temperature and provide status of it to the PLC; and
- an electronic pressure sensor at the top cover to monitor and track the internal pressure and provide status of it to the PLC by electronic signals processed according to the software specifically developed for this application.

14. A reactor for food processing comprising:
- a main body, wherein the main body includes a top portion having a cylindrical shape, a middle portion having a conical shape, and a bottom portion having a cylindrical shape;
- a bottom base connected to the bottom portion of the main body;
- a top cover connected to the top portion of the main body;
- an upper fast action valve connected to the top cover, wherein the food slides through the upper fast action valve before entering the top portion of the reactor;
- a lower fast action valve and its actuator mounted in the bottom base;
- at least one nozzle located in the bottom base,
- wherein the at least one nozzle is located equidistant among the bottom base,
- wherein the at least one nozzle allows the injection of the hot fluid into the reactor, wherein each one of the nozzles is placed at an angle in reference with the horizontal side of the bottom base to create a helicoidally spiral effect in the hot fluid inside the main body.

15. The reactor according to claim 14 further comprising a programmable logic controller (PLC), an upper fast action butterfly type valve connected to the top cover, a lower fast action butterfly type valve connected to the bottom portion of the main body, wherein the opening and closing of both valves are controlled by electronic signals from the PLC.

* * * * *